Oct. 10, 1961 L. S. LONGENECKER 3,003,650

MATERIAL HANDLING

Filed Nov. 5, 1958 8 Sheets-Sheet 1

INVENTOR.
Levi S. Longenecker
BY Green, McCallister & Miller
HIS ATTORNEYS

Oct. 10, 1961　　　L. S. LONGENECKER　　　3,003,650
MATERIAL HANDLING

Filed Nov. 5, 1958　　　　　　　　　　　　8 Sheets-Sheet 3

INVENTOR.
Levi S. Longenecker
BY Green, McCallister & Miller
HIS ATTORNEYS

Oct. 10, 1961 L. S. LONGENECKER 3,003,650
MATERIAL HANDLING
Filed Nov. 5, 1958 8 Sheets-Sheet 5

INVENTOR.
Levi S. Longenecker
BY Green, McCallister & Miller
HIS ATTORNEYS

INVENTOR.
Levi S. Longenecker

INVENTOR.
Levi S. Longenecker
BY Green, McCallister & Miller
HIS ATTORNEYS

Oct. 10, 1961   L. S. LONGENECKER   3,003,650
MATERIAL HANDLING

Filed Nov. 5, 1958   8 Sheets-Sheet 8

INVENTOR.
Levi S. Longenecker
BY Green, McCallister + Miller
HIS ATTORNEYS

United States Patent Office

3,003,650
Patented Oct. 10, 1961

1

3,003,650
MATERIAL HANDLING
Levi S. Longenecker, 61 Mayfair Drive, Mount Lebanon, Pittsburgh 16, Pa.
Filed Nov. 5, 1958, Ser. No. 772,650
16 Claims. (Cl. 214—35)

This invention pertains to material handling apparatus and more particularly, to apparatus suitable for charging larger quantities of irregular shaped material, such as strap metal, into a melting furnace, such as an open hearth furnace.

In charging open hearth furnaces, conventional procedure involves the utilization of a series of charging boxes carried on buggies that run on rails in front of the furnaces. A peel is employed to successively engage each box and, after a furnace door has been raised vertically, move it into the furnace and rotate it to discharge the scrap material. Boxes for this purpose have a capacity in the neighborhood of 35 to 50 cubic feet and it is customary to carry four boxes on each buggy. A minimum time for charging each box is about one minute which, for four boxes of about 4800 pounds of scrap, involves a minimum period of about four minutes.

The present-day practice has been towards the employment of larger and larger capacities of open hearth furnaces and this poses a problem from the standpoint of apparatus and operations for charging them with scrap. It is my opinion that because of limitations in this connection, the operation of large open hearth shops has been throttled down to about 80% of what should be their maximum output rate.

Scrap charging is a vitally important phase of open hearth operation, in that metal processing may ordinarily employ a charge consisting of about 35 to 60% of scrap material. To in some sense meet the need for faster scrap charging, the present-day tendency has been to increase the size and number of charging doors. This does not solve the problem, since we still have the so-called thimble-size boxes and cumbersome, complicated train lengths and installations. For example, a 300 ton open hearth furnace on a forty percent practice will require 120 tons of scrap and this will have to be delivered in front of the furnace by about 50 buggies or 200 boxes. For good melting-down efficiency, the scrap should be charged as quickly as possible and in a manner that favors combustion volume and exposes the maximum amount of scrap surface to the flame.

In evaluating the problem, I reached the conclusion that the only practical approach is to provide a much larger size of charging box than heretofore utilized and to find some method of effectively handling, utilizing and discharging such a type of box. Further, such charging should be effected in a manner so as to avoid damage to the hearth floor and minimize loss of heat during the charging operation. When using larger boxes, it is necessary to pay particular attention to the safety of the operating personnel.

In my Patent No. 2,656,055, I was able to devise a charging device which marked a definite forward step from the conventional scrap box utilization. By employing the construction of such patent, I have been able to carry a much larger capacity of scrap in one box and to effectively charge it through the front door of an open hearth furnace. This construction has found favorable reception and utilization, but I have determined that the trend is for still larger capacities of charging means and for means that will eliminate the need for train and track installations, as well as delivery-effecting peel means. In this connection, it will be apparent that there is a practical limitation in the number and size of scrap boxes that may be effectively used for a given open hearth furnace installation. This limit has been approached in present-day practice and, as pointed out above, has resulted in "below-capacity" operations.

Thus, it has been an object of my invention to solve the problem presented due to the need for increased sizes and capacities of open hearth furnaces and essentially, from the standpoint of effectively and efficiently charging them with scrap material;

Another object has been to fully develop and meet factors which enter into the problem and to provide a construction and procedure which fully meet such factors;

A further object has been to devise and provide a practical overhead type of charging operation and construction as applied to an open hearth furnace;

A still further object has been to eliminate conventional buggy-carried and charging-machine scrap charging and to provide a new approach to the charging of open hearth furnaces;

These and many other objects of my invention will appear to those skilled in the art from the illustrated embodiment thereof.

In the drawings,

FIGURE 10 shows the plate member 38 in position;

Figure 1:
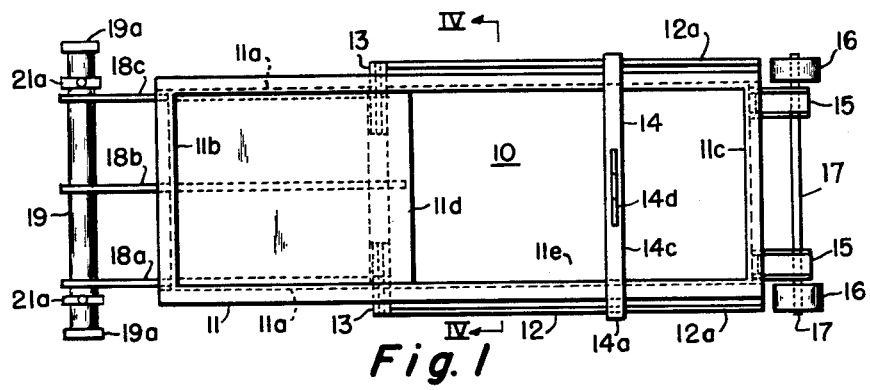
FIGURE 1 is a top plan view of a charging box employing my construction.

In arriving at my invention, I have made a rather radical approach to the problem, in the sense that I determined that it could only be solved in a practical manner by top or roof charging and that top or roof charging could actually be successfully accomplished as applied to large open hearth furnaces.

It is well recognized that in electric arc furnace utilizations employing small to medium-size furnaces, it has been customary to raise or side-pivot the entire roof on a vertical axis, so that scrap material may be introduced directly. However, even in such a utilization in larger size furnaces, the practice has been to avoid top charging and to go to door charging as in an open hearth furnace. That is, it becomes impractical to raise or pivot a furnace roof above certain sizes, regardless of the type of heating operation which is involved. Also, the larger the furnace generally the greater the height of drop and the more danger of damage to the bottom during the charging operation.

As distinguished from an electric arc furnace, the problem of roof charging is more complex as to an open hearth furnace and to my knowledge, has never been accomplished by those skilled in the art. One reason is the relatively complex and heavy arch roof construction of an open hearth and the heat loss which would ensue from even temporarily removing such a roof for charging purposes. Headroom and clearance spacing are also important factors entering into the problem.

In carrying out my invention, I provide an entirely new form of door construction, that will control and open a localized charging area of sufficient and efficient size in the roof of an open hearth furnace, and that will provide a maximum effectiveness of scrap charging as utilized with a scrap box, with a minimum loss of heat, and without the necessity for other than remote manipulations by the operator.

An integral door, gate or portal structure is pendent or mounted for top and bottom swinging or pivotal movement about a substantially horizontal axis, as distinguished from the normal side swinging movement about a vertical axis that may be employed for the complete roof of a small or medium-size electric-arc furnace. The special door construction 35 shown has two parts or sections A and B that are located in an angular relationship with each other. One (a substantially vertical closure or front) part A constitutes a part of the front wall structure of the furnace 25 and the other (a roof, substantially horizontal cover or top) part B constitutes a part of the arch or roof structure. Such parts or sections are integral, extend in an angular relationship with each other, and are supported by an axis that is shown as lying beyond or above their connecting portion, apex or angle. The substantial L-shape of the construction and its type of mounting enable it to be easily swung from a closed to any suitable intermediate open position. The to-the-left offset location of its center of gravity is such that when released, it will tend to swing clockwise (to the left of FIGURE 5) towards an open relationship with respect to the main body of the roof (see FIGURE 6). I also contemplate a door which essentially comprises section B extended at its lower end to cooperate with a permanent vertical side or front wall of the furnace 25. It will be noted that the swing door of my invention is of a type such that it, in effect, only partially opens and to the extent necessary for the introduction of feed discharge from an above-positioned feed chute C. That is, the furnace door of my invention is a corner-mounted swing door that is operatively mounted as to a feed opening of the furnace. The furnace 25 may have a suitable number of doors and of corner feed openings depending upon its size or capacity.

The means for mounting and operating the door construction is located out-of-line with respect to direct furnace heat and in such a manner, that when the construction is in its open position, the front opening in the furnace that has been exposed by a forward displacement of the front or vertical part A is substantially closed-off by the roof part B that has been displaced downwardly to expose a top feed opening or charging area. The latter is, in turn, at least partially closed-off by a feed or charging scrap box 10. In addition, the box is employed in such a manner as to quickly and effectively deliver scrap material downwardly into the furnace 25 in an inclined or in a declining path of movement, directed towards the back of the furnace, and in such a manner that the vertical distance of travel of the scrap to the hearth floor is minimized.

The charging box or device 10 may be moved into an operative position on top of the furnace, entirely by hoist means, to a position in substantial alignment with the roof part of my swinging door structure 35, so that it is in this overhead position when the door is swung or moved clockwise towards an open position. The charging device or box 10 has a pivoted chute-like bottom which is then manipulated to project into the then-exposed top opening in the furnace and to decline or extend backwardly therein and behind the downwardly-swung position of the roof part B.

During the operation of the charging box or device, its forward or leading end is pivoted on wheels or rollers which rest on a roof track or guide 64 and along which it may be moved by one of an operating pair of overhead hoist means. This makes possible a back and forward stroking of the device or box 10 near the end of the charging operation which may be supplemented by a vertical stroking of its swing bottom portion by a second hoist of the operating pair. In this manner, scrap is completely discharged and with ultimate of speed. For example, employing a construction of my present invention, I have been able to completely discharge a box containing 1600 cubic feet or more of scrap material of, say 30 to 60 pounds weight per cubic foot, in about two minutes of operation. A single box or device 10 of my construction will take, handle and feed a charging load which is greater than that which can be taken, and handled and fed by forty scrap boxes of a normal 35 cubic foot capacity. Thus I save a minimum of 40 minutes less 2 minutes or 38 minutes in charging time, alone.

The charging device

Figure 2:
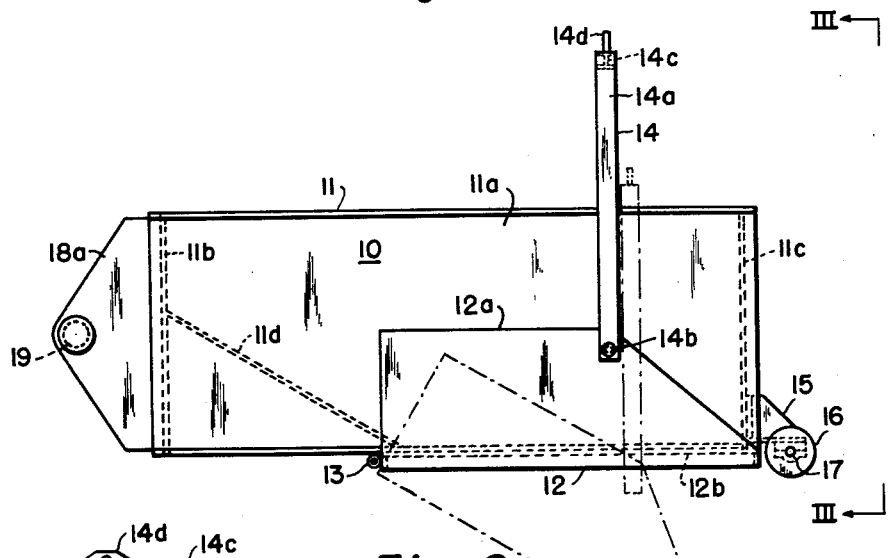
FIGURE 2 is a longitudinal side view in elevation on the same scale and of the box construction of FIGURE 1.
Figures 3, 4:
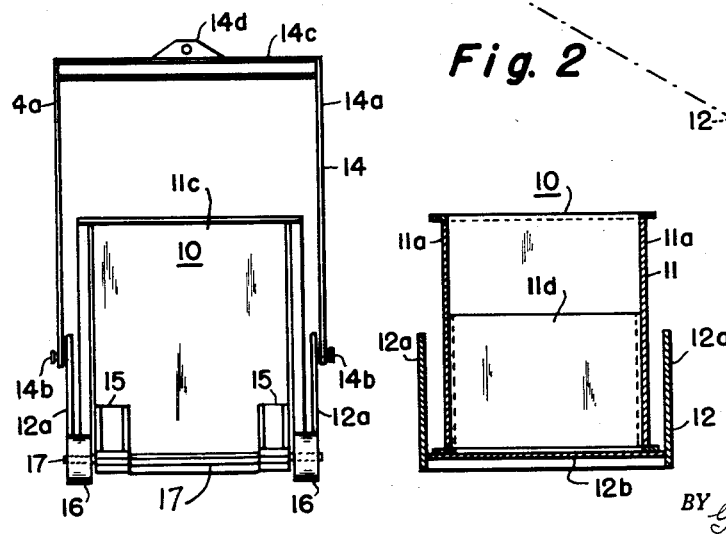
FIGURE 3 is a view in elevation of a forward end of the box construction of FIGURES 1 and 2, on the same scale as such figures, and taken along the line III—III of FIGURE 2.
FIGURE 4 is a transverse section in elevation on the scale of FIGURE 1 and taken along line IV—IV of such figure.
Figure 6:
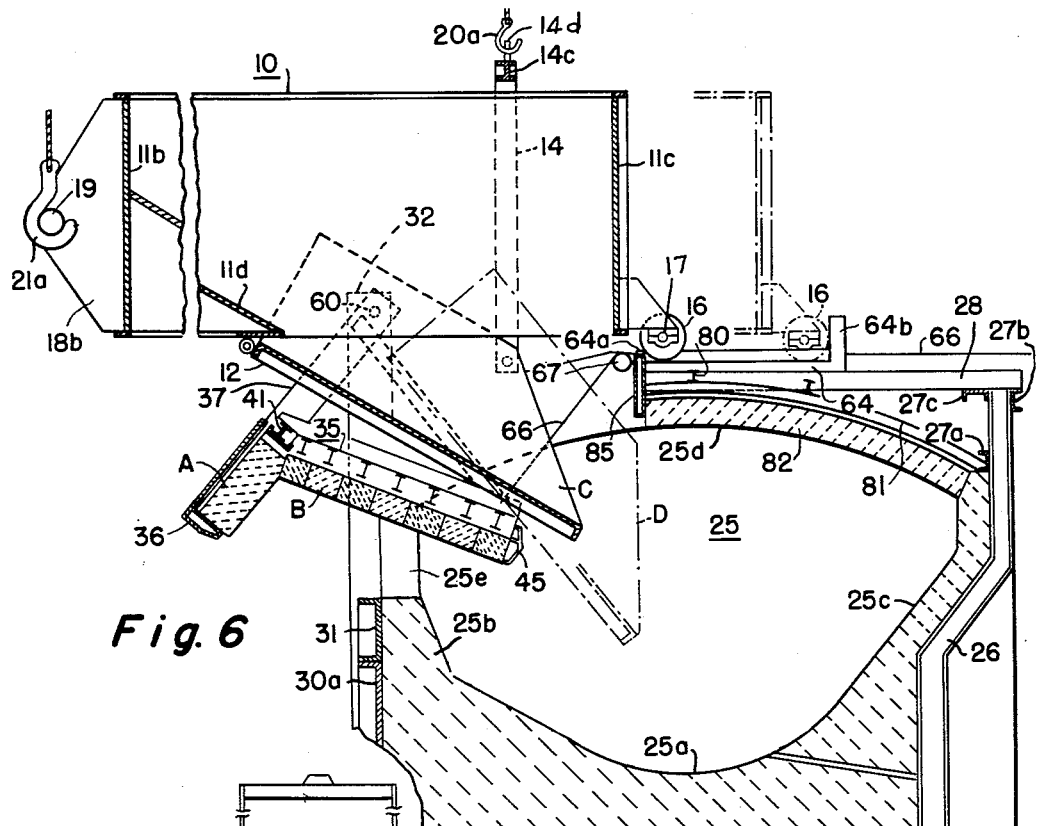
FIGURE 6 is a view similar to and on the same scale as FIGURE 5, but showing a swinging door construction or assembly of my invention in an open position as contrasted to the closed position of FIGURE 5.
Figure 7:
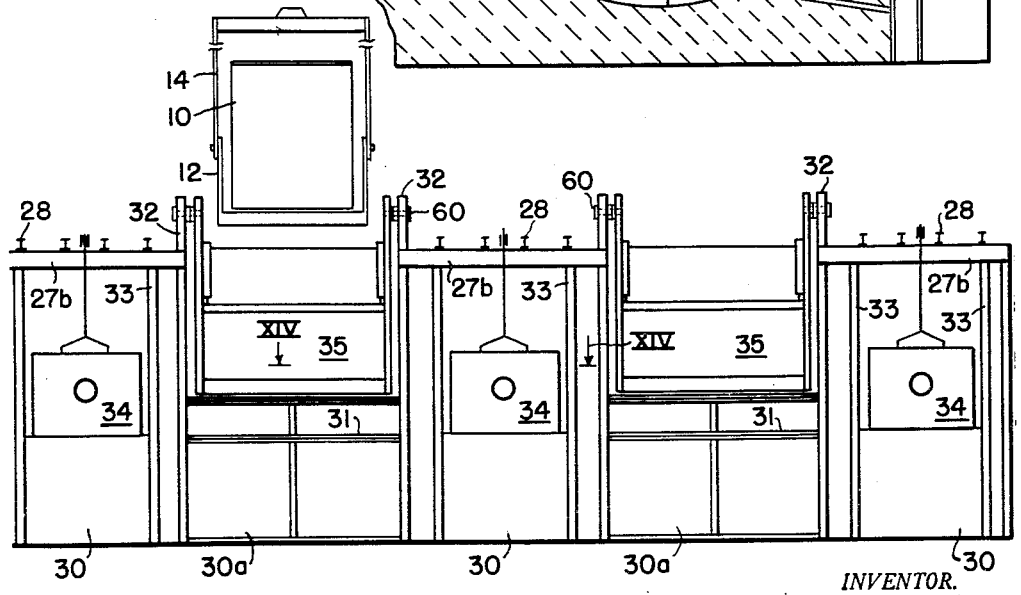
FIGURE 7 is a front view in elevation on a greatly reduced scale of a front end of a full furnace construction illustrating the employment of structure of my invention with conventional furnace structure; this figure shows three conventional and two swinging door constructions, with a charging box in an operative position above one of the swinging constructions.

As shown particularly in FIGRES 1 to 5, inclusive, and at least to some extent in FIGURES 6 and 7, I have provided a new and improved form of a charging box, car or device 10 for charging scrap or raw material into a furnace and particularly, through an open portion in its roof structure. The device 10, as shown particularly in FIGURE 2, is independent of any plant track and car layout system and may be entirely handled by overhead hoist means, such as a pair of hoist elements 20 and 21 of a crane construction (see FIGURE 6). That is, the device 10 may be loaded at some suitable location in the shop and then carried by hoist means to an operative position on top of the furnace which is to be charged and into association with a feed portion or charging area in its roof.

The roof structure of the furnace is provided with a relatively short length of track or a restricted guide and support 64 to receive rollers or wheels 16 at one end of the device 10, to aid in supporting it during the delivery of scrap and to facilitate a so-called stroking movement of the device, such as may be employed during a latter portion of a scrap-charging operation. In other words, the device 10 is provided with a pair of transversely spaced-apart projecting mount ears 15 at one end thereof that carry cross shaft 17 on which wheels 16 are rotatably secured, so that it may be operated as a tilt cart and utilized in a highly effective manner to deliver raw or scrap material.

The construction and its manner of utilization are such that a relatively large size device 10 may be employed, say in the neighborhood of 1600 cubic feet capacity or more, and is shown as having a body portion 11 made up of vertically-extending and transversely spaced-apart side wall portions 11a, and integral and connecting front and back side (end wall) portions 11c and 11b. Its front end portion is provided with a tapered feed chute bottom member or portion 11d which declines backwardly of the furnace and is integral with the portions 11a and 11b and projects at its lower end to an intermediate length portion of the device or box to define the forward limit of its extending, open-bottom or feed-mouth portion 11e. The lower end of the member 11d thus slopes or projects towards the back end portion of the melting furnace and forwardly with respect to the direction of feed of the scrap material and in a cooperating relation with the back end portion of a swing feed chute member 12.

A swing chute member 12 of substantial U-shape extends from the intermediate length portion of the box 10, towards its back, and along its open feed portion. The chute 12 has vertical side wall portions 12a that extend along the outside of the side walls 11a (see FIGURES 1 to 4) and transversely thereacross to define a closure bottom portion 12b for the device. At its back end, the swing chute 12 is provided with a pair of swing pivot hinges 13 (see FIGURES 1 and 2) that are mounted on the box 11 beneath the forward feed end of the fixed or stationary chute portion 11d and adjacent the back end portion of or somewhat intermediate the longitudinal extent of the box 11.

As disclosed particularly in FIGURES 1, 2, 4 and 5, the swing chute 12 is adapted to completely close-off the open bottom portion 11e of the box part 11, and also to swing downwardly or decline from its hinges 13 and into the furnace 25 (see FIGURE 6). By way of illustration, I have shown by dot and dash lines a preliminary open feed position C and a final position D.

The raising, lowering and stroking of the feed chute part 12 is accomplished by means of a U-shaped, bifurcated frame structure, yoke or fork member 14. The structure 14 has spaced-apart legs 14a pivoted at 14b to the sides 12a, and top and cross connecting portion 14c carries an eye portion 14d to receive a hook part 20a of a hoist, such as 20 (see FIGURE 6).

For moving the device 10 from one horizontal position to another and for stroking or reciprocating it in its feed position, I have provided the rear portion with a series of transversely spaced-apart and outwardly-projecting tabs or ears 18a, 18b and 18c (see FIGURES 1 and 2). The ears receive and are secured by welding to support a hoist shaft or rod 19. The hoist shaft or rod 19 has latch end portions 19a and is adapted to receive the hook portions 21a of a hoist 21 (see also FIGURES 5 and 6).

*The furnace construction*

Figure 5:
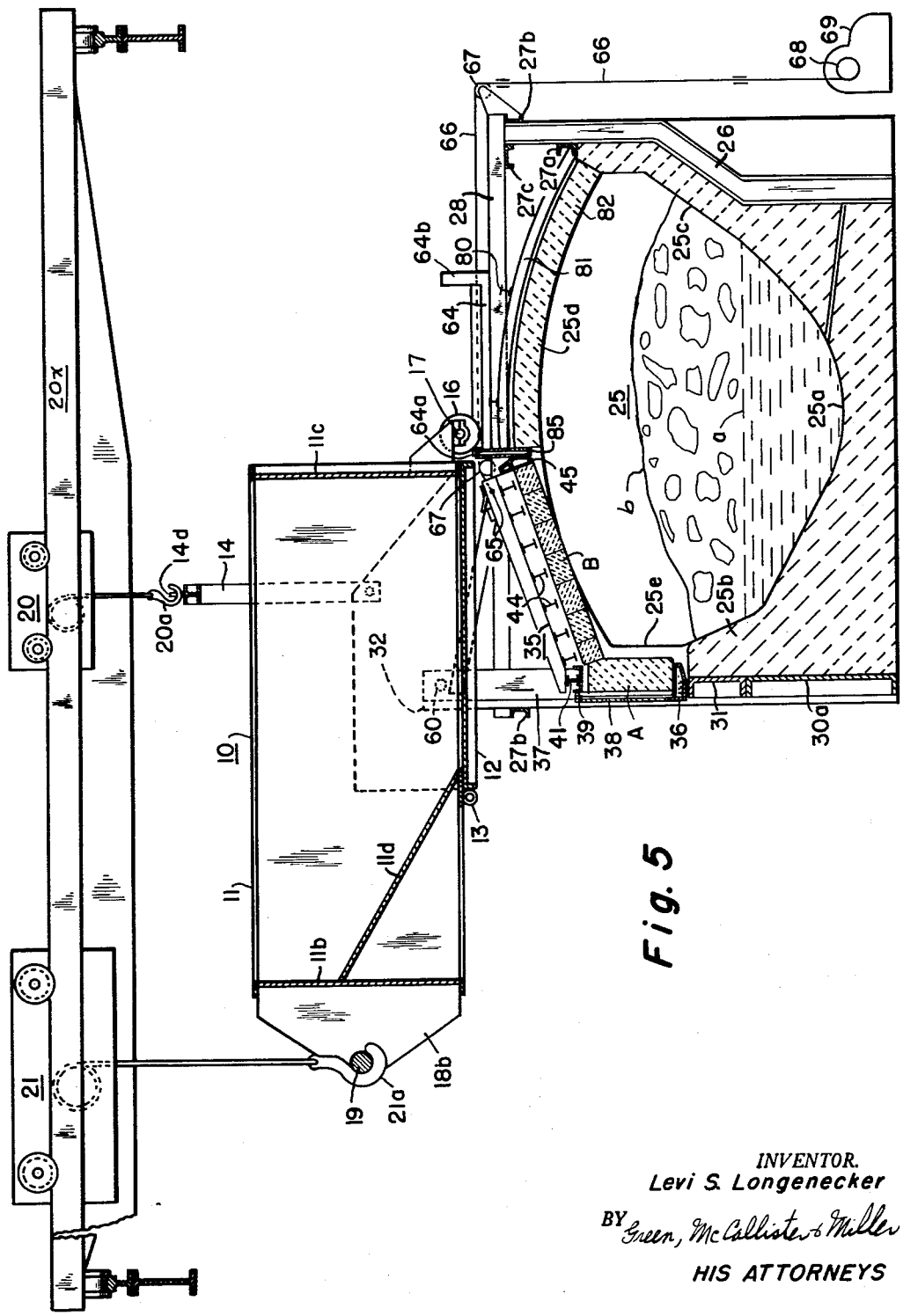
FIGURE 5 is a side view in partial section and elevation illustrating a furnace installation employing the construction of my invention, including the charging box of FIGURES 1 to 4, inclusive.

Referring particularly to FIGURES 5 and 6, I have shown an open hearth furnace 25 constructed to utilize the charging structure of my invention. The furnace 25 has a refractory hearth floor or bottom portion 25a, a refractory front stub wall or bank portion 25b, a refractory front end wall portion 25e, a refractory back wall 25c, and a refractory sprung arch or roof 25d that extends from the back end of the furnace to its front wall 25e and thus, above the major portion of the furnace, exclusive of the portions thereof served by the swing doors 35 of my invention, but including conventional slide doors 34, as disclosed in FIGURES 7, 8 and 14. The structure and mounting of the main roof section or part 25d is shown employing the basic design disclosed and illustrated in my co-pending application No. 356,227, filed May 20, 1953, and entitled "Furnace Refractory Structure and Mounting," now Patent No. 2,738,744 of March 20, 1956. This is also true as to the construction and principles of mounting refractory brick or tile employed for parts A and B of my swing door construction 35.

As shown particularly in FIGURES 6 and 7, the furnace 25 has a conventional door sill level, see the top of sills 30 and the height of molten material a, showing the increased height of door sills 31 employed for swing doors 35. A metal back frame structure 26 projects upwardly along the furnace 25 to cooperate with metal roof frame members 28 and arch beam or support members for the structure 25d. Cross channel members 27a, 27b, and 27c reinforce the structures 26, 28, 81, and 81' and the interconnected relationship therebetween.

The overhead or roofing frame structure 28 carries an overhead guide or platform structure or track 64 for each swing door unit 35 and on which wheels 16 of the scrap car or box 10 are adapted to pivot and move. It will be noted that the car or box 10 is pivotally moved on wheels 16 substantially horizontally along the member 64 and between its forward or front stop abutment 64a and its relatively higher, back or rear abutment portion 64b.

Figure 8:
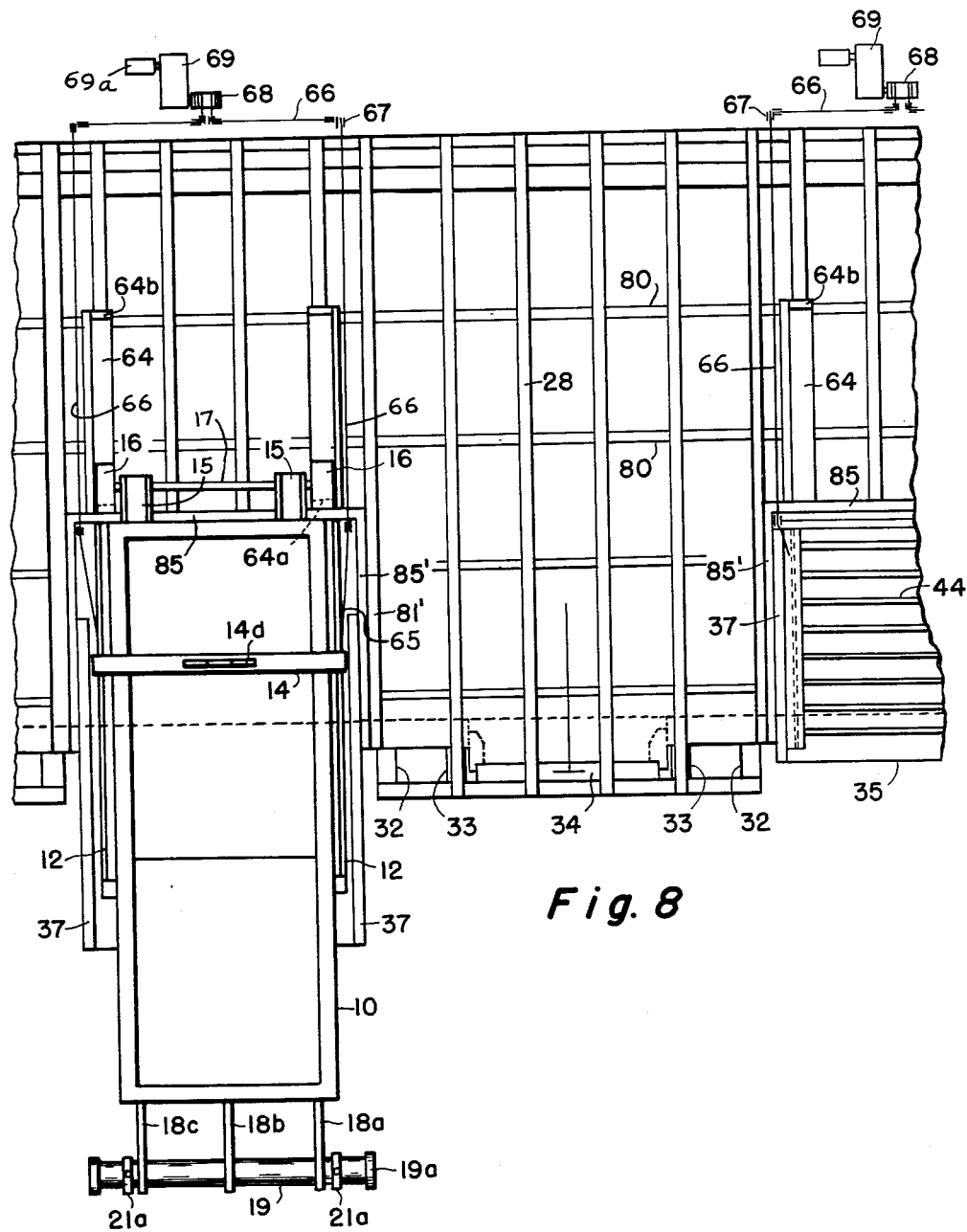
FIGURE 8 is a fragmental top plan view of the same scale as FIGURES 5 and 6 and particularly illustrating the operative position of a charging box of my construction above or over the furnace for cooperative use with a swinging door construction.
Figure 14:
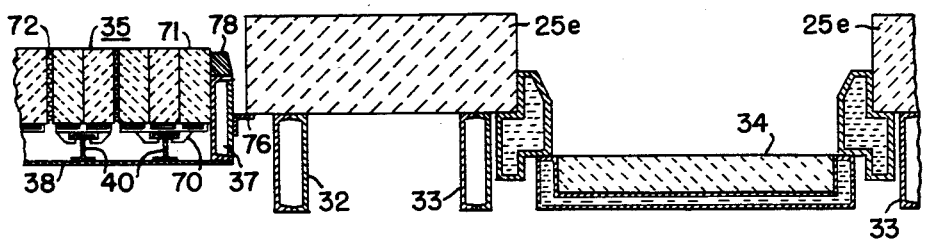
FIGURE 14 is a fragmental horizontal section, on the same scale as FIGURE 13, and taken along the line XIV—XIV of FIGURE 7.

By way of illustration, in FIGURE 7, I have shown a pair of special doors 35 of my swing construction and a series of intermediate, conventional slide-lift doors 34 (see also FIGURES 8 and 14). Any suitable type of doors 34 may be used (including those described in my Patents Nos. 2,494,713; 2,594,188; and 2,681,642), in order that front openings in the wall 25e will be exposed by raising the doors 34 with respect to side mountings 33 and by means of motor-driven chain or cable lift mechanisms, see FIGURE 7.

To reinforce and provide structural framework for the front portion of the furnace 25, a series of transversely spaced-apart front vertical upright members or beams are positioned in a spaced-apart relationship with each other to be secured to the top framework members 28. One set of vertical upright frame members 32 (see FIGURES 7 and 8) is employed for pivoting each special or swing door construction 35, and a pair of members 33 is in a like manner provided for guiding and positioning each conventional door construction 34. As shown, metal bottom sill members 30 are provided for the doors 34 and similar height bottom door sill members 30a are provided for special doors 35 to cooperate with an upper fore or supplemental sill member 31.

Figure 9:
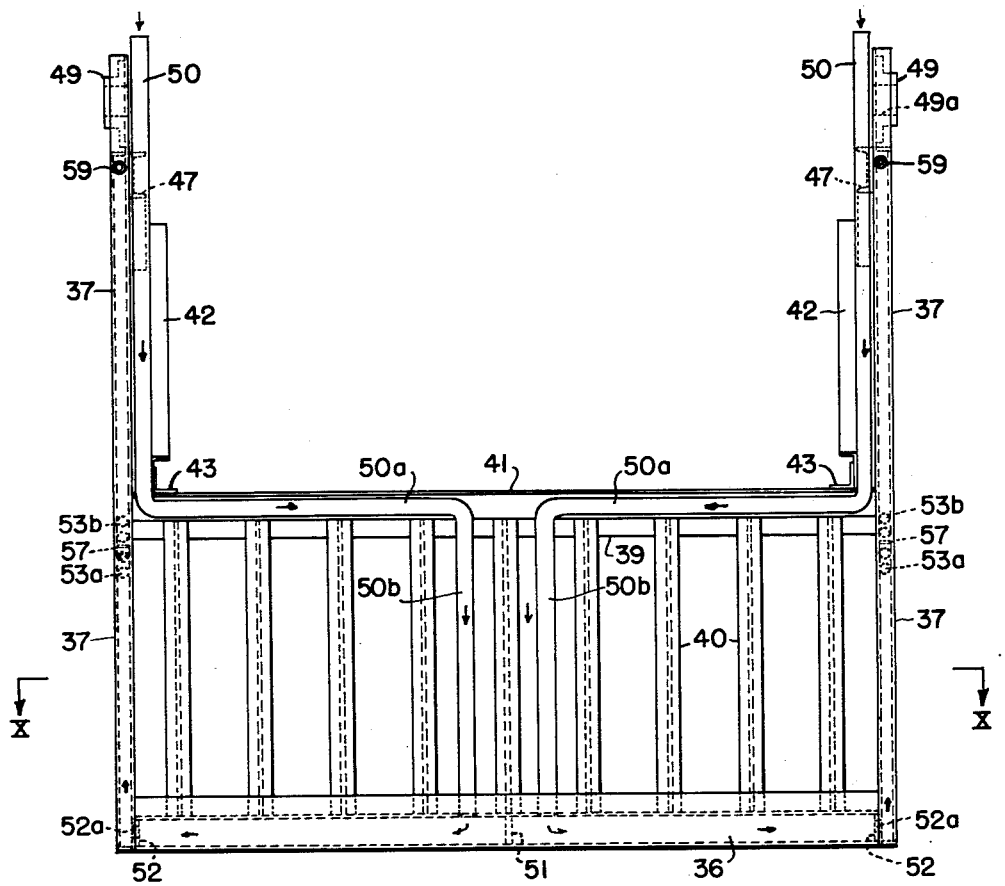
FIGURE 9 is a front view in elevation of an enlarged scale of the swinging door construction of my invention with plate member 38 of FIGURE 5 removed.
Figure 10:
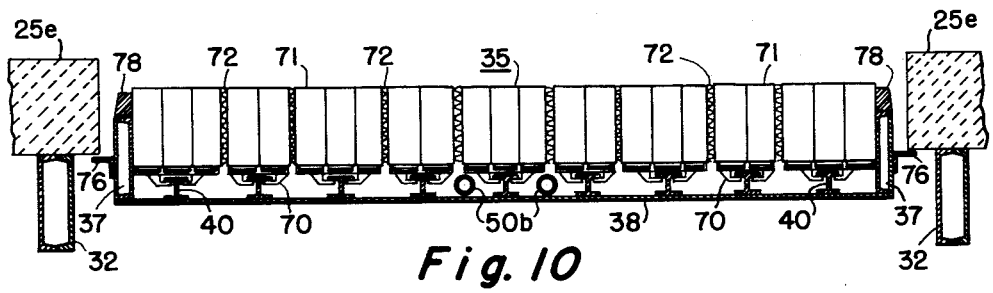
FIGURE 10 is a horizontal section along the line X—X of FIGURE 9 and on the same scale as such figure; however.
Figure 11:
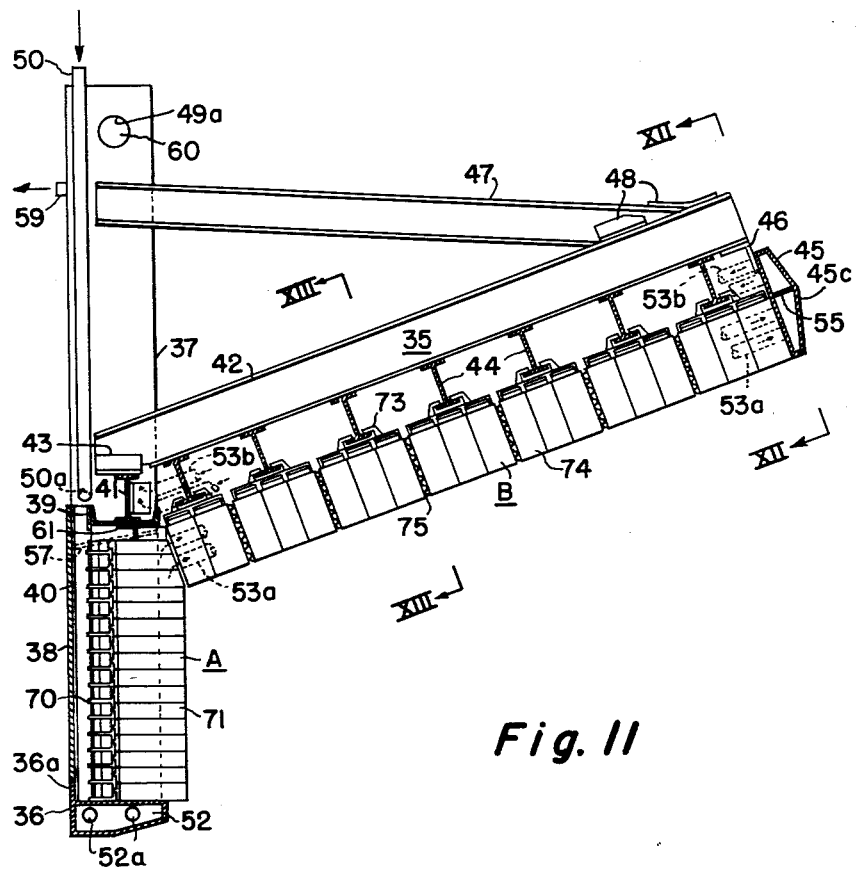
FIGURE 11 is an enlarged side fragmental section further illustrating the swinging door construction of my invention, as shown in FIGURES 9 and 10, and on the same scale as such figures.

As shown particularly in FIGURES 5, 6 and 11 of the drawings, the swing door 35 has a lower and substantially vertically-extending front or fore closure part A and a backwardly-extending and slightly upwardly-inclined, substantially horizontally-extending, radial, suspended roof arch closure part B. As shown in FIGURES 9, 10 and 11, the fore or upright part A of the door 35 has a compartment-defining, substantially horizontally-extending bottom header and hollow frame member 36, and a pair of vertical side header and hollow side frame members 37 which are connected thereto and project upwardly therefrom to define a substantially U-shaped construction, looking from its front side. As shown particularly in FIGURE 10, the part A is enclosed by a metal front sheathing 38 which is secured to flange portion 36a of the bottom member 36 (see FIGURE 11), to sides of the members 37 and to outer flanges of members 40, to define spacing that is upwardly open of the roof part B. As shown in FIGURES 9 and 10, the front sheathing 38 carries a series of transversely spaced-apart and vertically-extending, short-length support members 40 of I-beam construction. Back flanges of the support members 40 receive hangers 70 (see my before-mentioned co-pending application). The hangers 70 carry refractory blocks 71 which, as shown in FIGURE 10, have suitably located, corrugated metal expansion members 72.

Also shown particularly in FIGURE 10, the front assembly of blocks 71 is held in position along its sides by the vertical side header or frame members 37 of hollow construction, at the bottom by the transverse header 36 (see FIGURES 9 and 11), and at the top by a cross channel 39 which carries a block-engaging, transversely-extending and suspended angle piece member 61. The top sill channel 39 of the door part A also carries a transversely-extending beam member 41 which is secured thereto and which is secured at its ends to the vertical side members 37. The upper ends of the vertically-projecting and transversely spaced-apart I-beam support members 40 for the refractory block are secured to the channel member 39 and their lower ends are secured to the bottom sill and header member 36.

It is thus apparent that the door part A is strongly made of metal members and in a form of a framework which supports protective refractory tile or block along its inner face or towards the inside of the furnace 25 to protect such parts from the intense heat of the furnace. The side members 37 project vertically-upwardly beyond the upper cross member 39 and each carries a bearing mount 49 whose bore 49a is adapted to rotatably receive pivot or swing pins or elements 60. The pins 60 extend into and are secured (see particularly FIGURES 5, 6, 7 and 11) to vertical side support members 32 at the front of the furnace support framework structure. Thus, the special door 35 of my invention is adapted to swing on the pins 60 with respect to the members 32 and on the members 37.

The upper or roof part B of my swing door construction also has a metal framework which carries or suspends an inner lining of refractory block or tile. As shown particularly in FIGURES 11 and 13, longitudinally-extending (front to back extending with respect to the furnace) side support members 42, as shown of I-beam construction, carry transversely-extending and longitudinally spaced-apart cross members 44, also as shown of I-beam construction. Block hangers 73 similar to hangers 70, carry or suspend refractory blocks 74 which are of similar construction to the blocks 71 and which as groups, may be separated by corrugated expansion, filler members 75.

Figure 13:
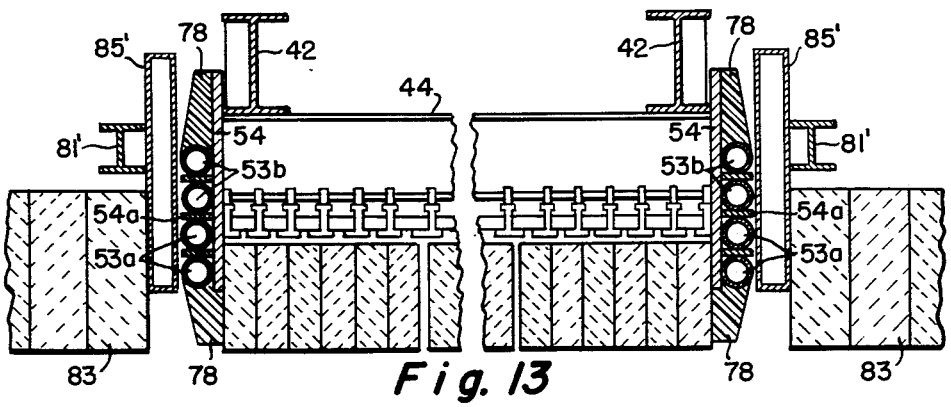
FIGURE 13 is an end section, partially broken away, and taken along the line XIII—XIII of FIGURE 11 and on an enlarged scale with respect to such figure.

As shown particularly in FIGURES 11 and 13, the back end portions of the longitudinally-extending side beam members 42 are secured to and are suspended from overhead beam members 47 which, as also shown in FIGURES 9 and 11, are at their upper or front end portions secured to upper portions of the door frame members 37. Angle pieces 48 (see FIGURE 11) are employed for reinforcing the fixed or secured relationship between the side beams 42 and the overhead suspension beams 47. The refractory block assembly of the roof part B, at its back end, abuts against a hollow back header member 45 and along its sides by metal banding members 54 (see FIGURES 11 and 13).

Cooling system

The banding members 54 have a series of outwardly-projecting, side finger or shelf portions 54a which carry and to which are secured a series of fluid-circulating, conduit pipe or tubing members. A lower pair 53a of such members serve as an inflow pair or set for cooling fluid and an upper pair 53b serve as an exhaust or outflow pair or set.

Figure 12:
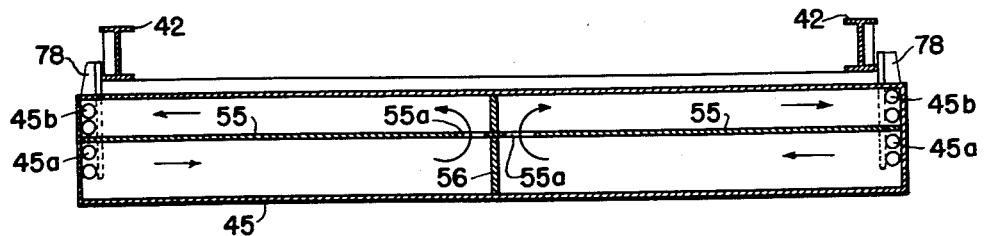
FIGURE 12 is a forward end view on the same scale as FIGURE 11 and taken along the line XII—XII of such figure.
Figure 15:
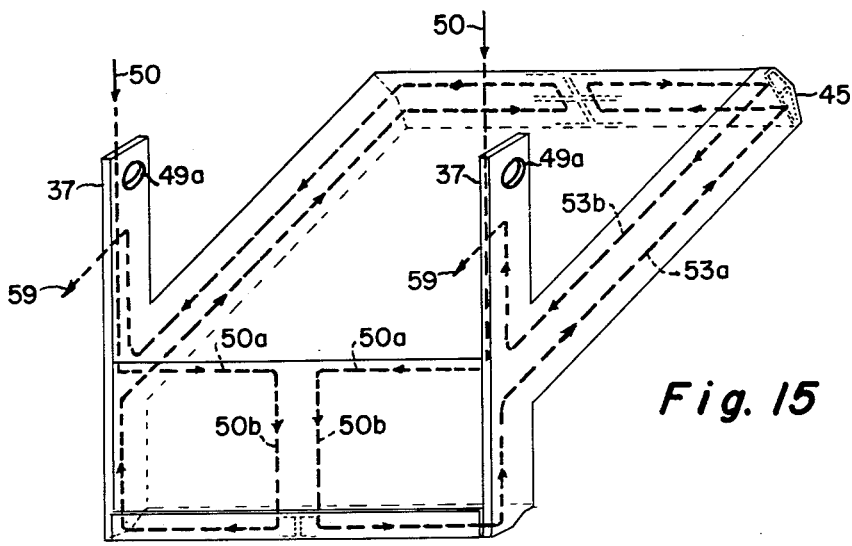
FIGURE 15 is a schematic isometric view of the swinging door construction on a reduced scale and illustrating cooling fluid jacketing, the circulating system, and cooling fluid flow therealong.

As shown in FIGURES 11, 12 and 15, the inflow conduit set 53a introduces cooling fluid or water into a lower chamber of the header member 45, while the outflow set 53b exhausts fluid from the upper chamber of the member 45. It will be noted that the upper and lower chambers are defined by a horizontal partition member 55 and are subdivided centrally by a vertical baffle member 56. Fluid-flow passageways or ports 55a are provided adjacent the partition 56 at inner-transverse ends of each half portion of the chambers to provide a flow of fluid, as indicated by the arrows of FIGURE 12, see also FIGURE 15.

The vertical baffle 56 separates the opposite halves or transverse portions of the width of the header 45 into segregated chambers, as also shown in FIGURE 12. As a result, the lower set of conduits 53a along one side of the roof part B supply cooling fluid for one half section (comprising an upper and lower chamber) and the lower set of conduits 53b along the other side supply cooling fluid for the other half section. As shown in FIGURE 12, the lower or inflow conduit set 53a are connected to the lower chamber by ports 45a in the member 45, while the upper or outflow set 53b are connected to the upper chamber by ports 45b.

Referring particularly to FIGURES 10 to 13 and 15, cooling fluid, such as water for the door construction 35 may be supplied by flexible piping or conduit (not shown) connected to upper feed inlet ends 50 of a fluid circulating piping system. As shown by the arrows in these figures, the cooling fluid flows downwardly along vertical side branches 50 that are carried by the members 37, into horizontal branches 50a and along the top portion of the door part A, downwardly along vertical branch members 50b near the transverse center of the door part A, and then into the bottom header 36.

The bottom header 36, like the bottom of the back header 45, has a central vertical baffle 51 dividing it into side chamber sections or halves. Thus, one of the branches 50b introduces cooling fluid downwardly into the inner end of one chamber portion and the other branch member 50b serves in the same manner for the other end of the bottom header member 36. The cooling fluid then passes through a pair of passageways, ports or openings 52a in end baffles 52 (see particularly FIGURES 9, 11 and 15) and into bottom ends of the vertical header members 37. Fluid-flow is then upwardly along the members 37, as limited by horizontally-inclined baffles 57 which segregate upper and lower halves of the members 37 into upper and lower chambers (see FIGURES 9 and 11).

Adjacent the baffle member 57, the cooling fluid enters front or lower ends of the lower side conduit members 53a and flows in the previously-described manner and, as indicated by the arrows, through the chambers of the back header 45 into upper or back ends of the upper side pairs of conduits 53b, forwardly and downwardly into the lower end of the upper chambers of the members 37, and then vertically-upwardly along such chambers and outwardly adjacent the upper ends of the members 37 through discharge or exhaust outlet ends 59. The outlets 59 may also be connected by flexible tubing (not shown), so the fluid may be again cooled and recirculated back through the inlets 50.

Further structure

It will not be noted that the back header 45 is carried on a transversely-extending angle member 46 which is secured to extend across between the side beam members 42. I have, in FIGURE 10, shown heat-resistant plastic filler portions 78 of wedge-shape along back ends of the side frame members 37 and, in FIGURE 13, I have shown the use of similar portions 78 of wedge shape along top and bottom portions of conduit member sets, pairs of assemblies 53a and 53b. Also, as shown in FIGURE 10, vertical angle strips 76 are secured to the side members 37 as side sealing members for the front part A of the swing door 35. As disclosed, the members 76 extend across to abut against front wall blocks 25e of the furnace 25 at the front opening for the door construction.

As shown in FIGURES 5 and 6, the sprung arch portion 25d of the roof construction at its front face and along sides of each roof opening for each door construction 35, has a hollow facing member 85 of metal positioned therealong. The member 85 may, as shown, be secured to the front ends of the longitudinally-arched support members 81 to project transversely-vertically therefrom and form a seal with a face such as the declining face 45c of my swing door construction 35, see also FIGURE 11. In a similar manner (see particularly FIGURE 13), the longitudinal sides of the refractory block roof structure that define side portions of the feeding or charging opening for special door construction may, as shown, have hollow sealing members 85' for sealing abutment with sides of the swing door 35. The side seal members 85' are secured to and carried by longitudinally-extending and arched, full length, supporting members 81' of fully covered portions of the roof construction.

Referring particularly to FIGURES 5 and 6 of the drawings, in operating the swing door construction 35, I prefer to swing it or drop it clockwise to any suitable open position and preferably, with a maximum stroke of less than about 50°. I found this to be sufficient for the full and effective utilization of a scrap charging box such as 10. Thus, under these conditions, the box 10 may be fully stroked as indicated, for example, by positions C and D of FIGURE 6, to facilitate delivery of scrap and the final delivery of the full content of the box into the furnace 25 without damage to it.

The swinging of the door 35 is a simple operation, since it is normally balanced so as to move to its open position under the influence of its weight or mass distribution and to be raised or pulled to its fully closed position by motor-driven cable and drum means. In FIGURES 5 and 8, I have somewhat diagrammatically shown means to swing the door 35 between its open position of FIGURE 6 and its closed position of FIGURE 5. This means includes an electric motor 69 having a control switch 69a, a gear unit 68 that is driven by the motor and has winding sheave means, and cables 66 that are guided by idler pulley means 67 to the winding sheave means. For simplicity of illustration, I have omitted showing the mechanism of FIGURES 8A and 8B on FIGURES 5 and 6 and 8 and have omitted showing the winding mechanism of the latter figures in FIGURES 8A and 8B. The electric motor 69 used may be a reversible type, using a power brake, so as to make possible retaining door structure 35 in any desired position with respect to the furnace 25 and the feed areas which are defined by openings therein.

Although I have, for simplicity of illustration, shown a common carrier or crane 20x having separate hoist means 20 and 21 (see FIGURE 5) for suspending and actuating the material positioning and charging box assembly or device 10, I also contemplate actuating its cart or more specifically, its wheels 16 by a motor-driven shaft, so that the assembly may be moved longitudinally along the upper framework of the furnace on the track 64 without employing the crane 20a as the actuating means. For example, the box assembly or device 10 may have the truck at its front end driven by an eccentric. I have constructed the door or swing closure unit 35 that is made up of wall and roof sectors A and B in a substantially angular relationship with each other, so that it is balanced to swing downwardly to an opening position or until it overcomes its angle of repose when it is released by its operating or actuating means; however, it will be apparent that it may be positively actuated in both directions if desired.

Among the important features of my invention is the progressive nature of the feeding operation of the material into the furnace, so that such material may be spread along or backwardly and forwardly on the furnace hearth or floor in a substantially uniform manner, and so that the weight of material fed at a given instant may be proportioned to prevent any damage to the refractory floor or hearth. As shown particularly in FIGURE 6 of the drawings, it is apparent that the material being fed as well as its feeding means act to cloak the open roof portion or feed opening of the furnace. Also, the roof sector or section B of the swing door construction serves to, in effect, cloak the front wall opening at the same time. This, of course, minimizes heat loss which is further minimized by the effective, progressive or stroked feeding of the material into the furnace.

The oscillation of the inclined or declining feed plane of the chute portion 12 may be both longitudinal and vertical to assure (in a substantially radial plane) a full and complete discharge of the material from the box assembly 10. It will be noted (see FIGURE 6) that the forward portion of the chute 12 may have a spaced relation with the top, back portion of the frame of the roof sector B of the door unit, as provided by the hoist 20, or may lightly rest thereon to move (pivot and slide) with respect thereto during its oscillation or stroke (see positions C and D, for example). I prefer to stroke the unit 10 and its chute 12 by moving the unit substantially horizontally back and forth on its wheels 16, although the hoist 21 may be moved vertically to raise and lower the forward end of the unit. The hoist 20 may be moved vertically to close off the bottom of the unit 10, to provide a maximum limit of inclination for the chute 12, etc., and although both the hoists 20 and 21 may be moved substantially horizontally (see FIGURE 5) to stroke the the unit on its truck or wheels 16, in FIGURES 8A and 8B, I have shown a mechanism which may be employed to positively effect the stroking movement to provide a substantially uniform distribution of the scrap metal within the furnace as indicated by b of FIGURE 5.

Figure 8A:
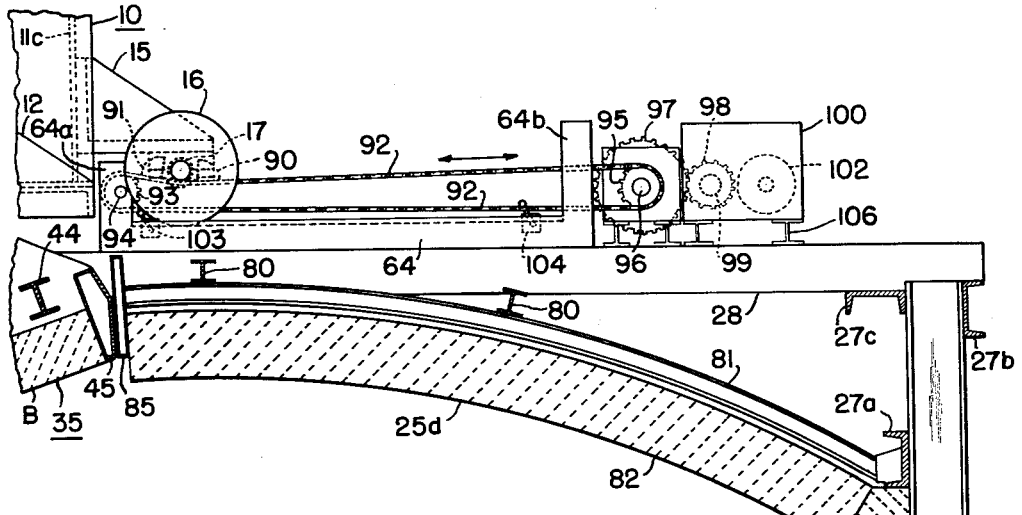
FIGURE 8A is an enlarged fragmental side section in elevation taken near the back end portion of the furnace and particularly illustrating mechanism for positively moving the charging box backwardly and forwardly.
Figure 8B:
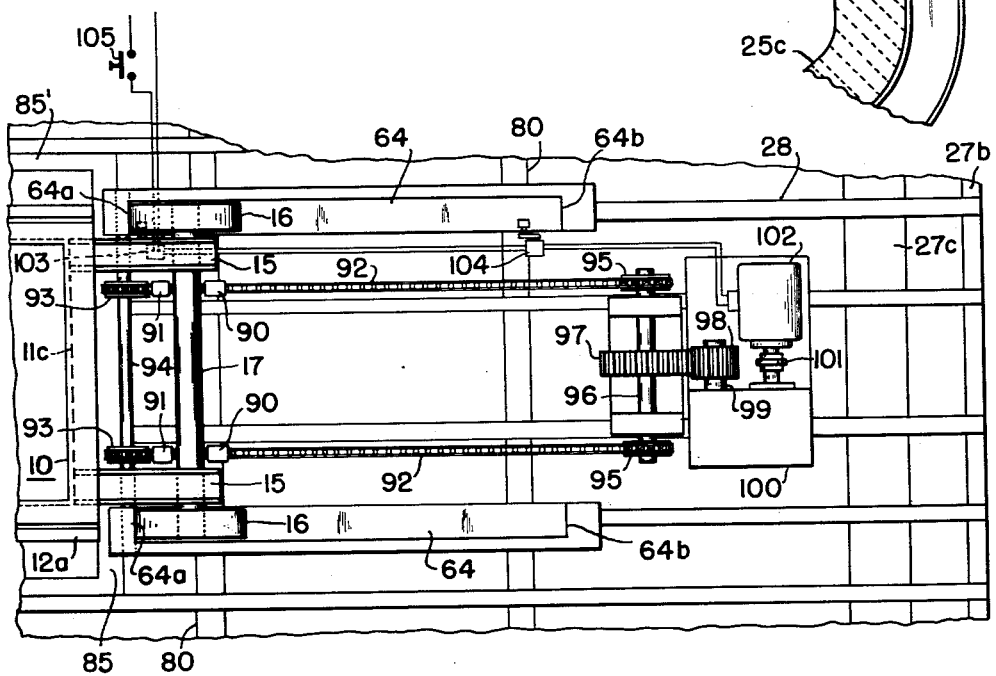
FIGURE 8B is a top plan view of the structure and on the same scale as FIGURE 8A showing operating controls for motor drive means of the movement producing mechanism.

In FIGURES 8A and 8B, the wheels 16 are shown rotatably positioned on the stationary cross shaft 17 that is carried by mount ears 15 at the forward end of the charging device or box 10. When the box 10 has been fully charged with scrap material in the amount necessary for in one operation charging the furnace 25, it is lowered by the hoists 20 and 21 to the position shown in FIGURES 8A and 8B, wherein the shaft 17 is positioned between longitudinally spaced-apart pairs of upwardly-projecting abutment fingers 90 and 91. As will be noted, there is a slight clearance provided between each pair of fingers, so that the shaft 17 can be easily inserted in alignment therebetween. Each finger pair 90 and 91 is secured on a side drive chain 92, so that back and forth or reciprocating horizontal movement of the chain (as indicated by the double arrows of FIGURE 8A) will move the device 10 between the position of FIGURES 8A and 8B and the dot and dash position of FIGURE 6.

As illustrated particularly in FIGURE 8B, I provide a pair of drive chains 92 which at their forward ends interleave over idler guide sprockets 93. The sprockets 93 are rotatably secured on a cross shaft 94 that is supported to extend between a pair of upwardly-projecting, forward, wheel stop, end parts or portions 64a of the longitudinally-extending track or guide supports 64. It will be noted particularly from FIGURE 8B that a pair of transversely spaced-apart guide supports or members 64 are provided and are securely mounted on horizontal framework members of the frame structure 28 in a position above the non-removable or stationary portion 25d of the furnace roof. The stop parts or portions 64a also project transversely inwardly to limit the maximum backward movement of the wheel 16 from the standpoint of the unit 10 and forward from the standpoint of the furnace 25, while a similar pair of upwardly-projecting back stop parts or portions 64b serve to limit the maximum backward movement of the wheels 16 from the standpoint of the unit 10. The drive chains 92 pass underneath the cross shaft 17 for the wheels 16 and backwardly to mesh with a back pair of drive sprockets 95 that are feathered or keyed to a cross drive shaft 96.

The drive shaft 96 is actuated by drive gear 97, pinion 98, and shaft 99 by gear reduction unit 100. An electric motor 102 is connected to the gear reduction unit 100 by a coupling 101 and is controlled as to its energization by a push button switch 105, see FIGURE 8B. As shown in FIGURES 8A and 8B, the motor gear reduction unit and the gear drive mechanism are all mounted on a platform by cross beam members 106 that are secured on the frame structure 28.

A limit switch 103 is carried by one of the guide members 64 at its one end portion and a second limit switch 104 is carried by it adjacent its other end portion to automatically effect a reversal of the movement of the motor 102 and the associated drive mechanism when the wheels 16 reach the extreme limits of their forward and backward travel. In this manner, the device 10 is automatically and positively stroked at a relatively slow speed of about 20 feet per minute, backwardly and forwardly in a substantially smooth manner, so that its feed chute 12 will be moved between representative positions C and D of FIGURE 6 to avoid a localized or uneven piling up of scrap material in the furnace 25 and to uniformly distribute it for melting in the manner indicated by the charged furnace of FIGURE 5. It may be noted that it is highly important to provide means to control or gradually feed or stroke the scrap material into the furnace 25, in order to avoid damage to its walls and bottom, to avoid jamming the opening so that the furnace door can be closed, and to also avoid blocking the complete discharge of the material from the chute means 12.

Although in accordance with my invention I found it necessary to provide means for, in effect, stroking the highly irregular shapes which constitute scrap material and which may include solid pieces of springlike coil pieces, bits of metal dust, metal angle pieces, limestone, etc., I early determined that a simple stroking action wherein the delivery means is maintained at a substantially constant angle of delivery was not practical. In other words, I found that an important factor was to not only stroke or move the chute means, but that it was necessary to simultaneously and in a progressive manner change the angle, inclination or slope of the delivery chute, by, in effect, also providing an automatic swinging movement of it during its stroking action. Otherwise, the end of the chute or stroking means will tend to jam in place against the scrap material already delivered to the furnace and not only prevent further delivery of the material, but prevent an effective stroking action to round out or uniformly distribute the scrap material as a charge within the furnace.

More particularly as shown in FIGURE 6, the operation is started from the back full-line position of the unit 10 and forward position with respect to the furnace 25 in which the chute means 12 has a slight angle or delivery slope to deliver the scrap material in a controlled manner and direct it more towards the back of the furnace chamber 25, and then to advance the device or box 10 forwardly towards the dot and dash position of FIGURE 6 which is backwardly of the furnace 25, while retaining the back end of the chute 12 on a pivoting, horizontally-movable plane and slowly increasing the angle of the slope and delivering the material more towards the forward end of the furnace chamber. During this movement, the forward or feed end portion of the feed or delivery chute 12 may, in effect, be slidably-pivotally supported behind or above its feed end (front end portion) with respect to, and if desired, on the inclined upper or supporting structure of the swing door construction 35. It is essential that in returning from the dot and dash position to the full line position of FIGURE 6 that the angle of slope progressively decrease to, in effect, give a top leveling action across the top of the scrap material and in such a manner as to permit such forward movement with respect to the furnace chamber without jamming of the chute 12 within the body of the delivery scrap material in the furnace. It will be further noted that the chute 12 always extends above and inwardly beyond the roof part B of the swing furnace door into the furnace in such a manner that the roof part is protected at all times during the delivery of the scrap material, and further in such a manner that it can be closed without being jammed by the scrap charge in the furnace. This is another important feature of my invention.

A positive and relatively slow moving mechanical actuation of the box 10 between its front and back positions is an important feature of my invention, particularly from the standpoint of attaining a more uniform distribution and complete build-up of the full charge of heavy and irregular shaped scrap material into and within the furnace chamber 25. It should be noted that the stroking feed of my apparatus is not a shoveling operation, in that the material in the box is progressively moved into the furnace chamber with a graduated gravity delivering action by a chute that constitutes a bottom portion of the box on which the material will normally rest when the chute is in its upper or bottom-closing position as to the box. The tiltable back and forth movement of the box and arcuate swing of the chute are also important from the standpoint of loosening any scrap material that may tend to cling to sides of the box, so that the controlled gravity flow action may be also effected as to it.

Referring particularly to FIGURES 1, 2, 3, 5 and 6 of the drawings, it will be noted that in accordance with my invention, the box 10 is stably balanced in its suspended relationship, as effected by the hoists 20 and 21 that may, as shown, be carried by the common carrier 20x. That is, I provide the hoist 21 with a pair of transversely spaced-apart hooks 21a which cooperate with opposite ends of the cross shaft or rod 19 between flanges 19a and 21a. The hoist 20 cooperates with a central hook 14d of the forked, U-shaped, bifurcated frame or yoke member 14 whose transversely spaced-apart legs 14a (see FIGURE 3) extend downwardly along opposite sides of the box 10 and are directly-pivotally connected at 14b to the back end portion of the chute 12. This provides a three-point suspension that effectively prevents any sidewise tilting of the box 10 on its longitudinal axis. It is essential that the box 10 be stable in its suspension while it is being moved in a loaded relation from a loading area or station to its position in substantial vertical alignment with and above the feed open portion of the furnace 25.

The inside depth or extent of the fork or yoke 14 between its pivot connections 14b to the chute 12 and its connecting top or cross portion 14c governs the maximum permissible amount of downward swing of the chute 12 when it is in its lower or charging position. This is true since the top portion 14c extends across and surmounts the top of the box 10 and will abut or rest upon the rim edges of the side walls 11a of the box to limit the maximum downward positioning of the chute 12. Thus, the yoke 14 provides an outside support for indirectly suspending or carrying the front end portion of the box 10 by means of its bottom chute 12. The yoke positively retains the chute in its upper or bottom-closing position as long as the box is fully suspended and until the forwardly-projecting end portion of the box rests upon the platform above the furnace. At this time, the hoist 20 may be actuated to allow the chute 12 to swing downwardly ahead of the separately supported front end portion of the box and into the feed open portion of the furnace.

In accordance with my invention, the operation of charging a furnace may be remotely controlled without the need for any operator or operators to be located on the support structure or the platform above the furnace roof, for changing the connections of the hoist hooks, for releasing or latching the bottom chute door of the box, etc. It will also be noted that where the furnace is of great depth, such that the material being gravity-introduced does not build up to a height corresponding to the inner end of the chute, that it is possible to effect the full discharge of the material in the box without a stroking movement. In such a case, the inclination of the chute may be varied by the hoist 20 to effect a gradual feed without damage to the furnace. It is also possible to raise and lower the back end portion of the box 10 pivotally about its extending back end when the latter is resting on the platform, to tilt the box with respect to the chute to further control the feed of the material.

This is a continuation-in-part of my now abandoned application, Serial No. 536,347, filed September 26, 1955, and entitled "Roof Charging."

What I claim is:

1. A material-handling apparatus suitable for charging irregularly-shaped solid material such as metal scrap in a controlled manner through an open feed portion in a furnace roof wall which comprises, wall portions defining a box-like structure for containing the material, a chute door swingably carried by a back end portion of and extending forwardly along the box structure to provide a bottom closure wall therefor when in an upper cooperating position with respect thereto, a downwardly open yoke member straddling a front end portion of the box structure and pivotally connected to a front end portion of said chute to indirectly suspend the box structure at its front end portion from said chute, means to separately and directly suspend the back end portion of the box structure, support means above the furnace roof wall, and the box structure having a forwardly-extending portion to rest upon said support means and release the box structure from its indirect suspension by said yoke member when the box structure is carried by said yoke member and said separate suspending means to a position above the open feed portion, so that said yoke member may lower said chute relative to the box structure to an inclined material feeding position with respect to the furnace.

2. Apparatus as defined in claim 1 wherein said forwardly-extending portion of the box structure has means positioning it on said support means for longitudinal back and forth movement therealong when said chute is in its inclined material-feeding position with respect to the furnace.

3. Apparatus as defined in claim 1 wherein said forwardly-extending portion of the box structure has means pivotally positioning it on said support means, so that the box structure may be swung by said direct suspension means on said support means with respect to said chute.

4. A material-handling apparatus suitable for charging irregularly-shaped solid material such as metal scrap in a controlled manner through a top open feed portion in a furnace construction which comprises, supporting wall portions defining a box-like structure for containing the material, a platform above the furnace opening, a chute door swingably carried by a back end portion of the box structure and defining a bottom closure wall therefor when in an upper cooperating position with respect thereto, a pair of separately-controlled variable-position suspending means to suspend the box structure in a balanced suspended relationship, a yoke member having a pair of spaced-apart legs straddling the box structure and pivotally connected to a front end portion of said chute wall, one of said suspending means cooperating with said yoke member to hold it and said chute in a suspended relation therefrom, said yoke member having a cross-connecting portion positioned above and cooperating with the box structure to limit the maximum downward swing positioning of said chute with respect to the box structure, the box structure having a front extending end portion to rest on said platform when the box is suspended by said suspending means over the open feed portion of the furnace and in such a manner that said chute may be lowered with respect to the box structure by said one suspending means within the feed opening to deliver the material from the box by gravity downwardly into the furnace.

5. Apparatus as defined in claim 4, wherein means connects the other of said suspending means to the box structure and means connects said one suspending means to said yoke member in such a manner as to define a three-point suspension for the box structure.

6. In a material handling apparatus suitable for charging large quantities of irregularly shaped material such as metal scrap into a melting furnace, wherein the furnace has enclosing side walls and a roof wall defining a furnace chamber, the roof wall is provided with an open feed portion therein, and a door is swingably mounted with respect to the roof wall to swing into and out of a cooperating closing-off relation with respect to the open feed portion; a horizontally-extending material-handling box having enclosing side and end walls to receive a relatively large furnace charge of the material therein, said box having a forwardly-extending portion, a feed chute having an open front feed end portion, means swingably securing a back end portion of said chute to said box adjacent a back end portion of said box to swing a front end portion of said chute between an upper substantially horizontal closing-off position along the bottom of said box and a downwardly-declining and extending delivery position with respect to said box, said chute in its upper position cooperating with said enclosing side and end walls to define a material-retaining bottom closure for said box, a support above the roof wall for receiving the forwardly-extending portion of said box thereon, means suspending said box in a substantially aligned material-discharging position with and above the open feed portion of the roof wall with its forwardly-extending portion resting on said support, said chute being swingable when said box is in the above-mentioned position to its downwardly-declining position to extend through the open feed portion into the furnace chamber, means supporting the front end portion of said chute in its downwardly-declining position within the furnace chamber, and means for moving said box backwardly and forwardly on said support while said chute is in its downwardly-declining position within the furnace chamber.

7. Apparatus as defined in claim 6, wherein said means for supporting the front end portion of said chute is a yoke member that downwardly straddles said box and is connected to the front end portion of said chute, and said front part is connected to an upper portion of said yoke member to suspend said chute, and when the forwardly-extending end portion of said box is off said support, to suspend the front end portion of said box through said chute when said chute is in its upper position with respect to said box.

8. In a material handling apparatus suitable for charging large quantities of irregularly shaped material such as metal scrap into a melting furnace, wherein the furnace has enclosing side walls and a roof wall defining a furnace chamber, the roof wall is provided with an open feed portion therein, and a door is swingably mounted with respect to the roof wall to swing into and out of a cooperating closing-off relation with respect to the open feed portion; a horizontally-extending material-handling box having enclosing side and end walls to receive a relatively large furnace charge of the material therein, said box having a forwardly-extending portion, a feed chute having an open front feed end portion, means swingably securing a back end portion of said chute to said box adjacent, a back end portion of said box to swing a front end portion of said chute between an upper substantially horizontal closing-off position along the bottom of said box and a downwardly-declining and extending delivery position with respect to said box, said chute in its upper position cooperating with said enclosing side and end walls to define a material-retaining bottom closure for said box, a support above the roof wall for receiving the forwardly-extending portion of said box thereon, means suspending said box in a substantially aligned material-discharging position with and above the feed open portion of the roof wall with its forwardly-extending portion resting on said support, said chute being swingable when said box is in the above-mentioned position to its downwardly-declining position to extend through the open feed portion into the furnace chamber, means pivotally supporting the front end portion of said chute in its downwardly-declining position within the furnace chamber, and actuating means to move the forwardly-extending portion of said box substantially longitudinally back and forth along said support while said box is suspended by said suspending means to pivot said chute on said supporting means while arcuately changing its slope of declination about said swingable securing means for gravity feeding the material from said box longitudinally along said chute downwardly within the furnace chamber while distributing the material substantially uniformly until said box is emptied and the furnace chamber is charged.

9. Apparatus as defined in claim 8 wherein, said means supporting the front end portion of said chute is carried above and by the door when it is in its open position, and said chute extends along, above and downwardly beyond the door when the door is in its open position.

10. Apparatus as defined in claim 8 wherein, pivot means is carried by the forwardly-extending portion of said box to engage said support, and said suspending means for said box has means to raise and lower the back end portion of said box about said support when said box is being moved longitudinally backwardly and forwardly along said support.

11. Apparatus as defined in claim 8 wherein, said actuating means for moving said box has a reciprocating mechanism mounted on said support and has portions to receive the forwardly-extending portion of said box to actuate said box in its back and forth movement with respect to said support.

12. Apparatus as defined in claim 11 wherein, said mechanism has motor-driven chain means provided with projecting fingers to receive the forwardly-extending end portion of said box thereon, and front and back limit means is associated with said mechanism to limit the extent of back and forth movement of said chain means.

13. Apparatus as defined in claim 11 wherein, said support has transversely spaced-apart track members, the forwardly-extending portion of said box has a shaft carrying a pair of wheels to operatively ride on said track members, said mechanism has a pair of drive chains operatively positioned above said track members and provided with pairs of upwardly-projecting fingers to receive said shaft therebetween, an electric motor is operatively connected to said chains to actuate them, electric limit switches are positioned along said support to engage said shaft, and said limit switches are connected by an electrical circuit to said motor to reverse the drive of said motor to control the maximum back and forth movements of said drive chains.

14. In a material handling apparatus suitable for charging large quantities of irregularly shaped material such as metal scrap into a melting furnace, wherein the furnace has enclosing side walls and a roof wall defining a furnace chamber, the roof wall is provided with an open feed portion therein, and a door is swingably mounted with respect to the roof wall to swing upwardly to close-off the open feed portion and to swing downwardly away from the open feed portion into an inwardly-declining position with respect to the furnace chamber; a substantially horizontally-extending material-handling box having enclosing side and end walls defining an open top portion to receive a relatively large furnace charge of the material therein, a feed chute having an open front feed end portion, means swingably securing a back end portion of said chute to said box adjacent a back end portion of said box, said chute in its upper position extending along the bottom of said box towards a back end portion thereof and cooperating with said enclosing side and end walls to define a bottom closure for said box, a first raising and lowering means connected in a balanced relationship to suspend a back end portion of said box, a second raising and lowering means connected to a front feed end portion of said chute to suspend the front end portion of said box and maintain said chute in its upper bottom-closing-off position with respect to said box when said box is suspended by said first and second means, said second means having means constructed to move said box in a suspended relation from a material-receiving position to a material-discharging position in substantial alignment with and above the open feed portion of the roof wall, means for swinging the door to its downwardly-declining position with respect to the furnace chamber when said box is in its material-discharging position, a support above the roof wall for receiving the front end portion of said box when said box is positioned above the open feed portion, so that said second means may be employed to lower a front feed end portion of said chute about said swingable securing means, said chute in its lower position extending through the open feed portion and in an inwardly-declining slidable relation above and beyond the door in its downwardly-declining position within the furnace chamber, means cooperating with the front end portion of said box to move said box forwardly and backwardly on said support to vary the position of said swingable securing means for the back feed end portion of said chute and vary the angle of inclination of said chute within the furnace chamber with respect to said door for feeding the material at a desired rate into and distribute it substantially uniformly within the furnace chamber until said box is emptied, said second means being operatable to raise said chute to its upper closing-off position with respect to said box and in cooperation with said first means to return said box in a suspended relationship to a position for again charging it with the material, and said means for swinging the door being constructed to raise the door to its upper closing-off position with respect to the feed open portion.

15. In a material handling apparatus suitable for charging large quantities of irregularly shaped material such as metal scrap into a melting furnace, wherein the furnace has enclosing side walls and a roof wall defining a furnace chamber, the roof wall is provided with an open feed portion therein, and a door is swingably mounted with respect to the roof wall to swing upwardly to close-off the open feed portion and to swing downwardly away from the open feed portion into an inwardly-declining position with respect to the furnace chamber; a horizontally-extending material-handling box having enclosing side and end walls defining an open top portion to receive a relatively large charge of the material therein, a feed chute having an open front feed end portion, means swingably securing a back end portion of said chute to said box adjacent a back end portion of said box, said chute in its upper position extending along the bottom of said box towards a front end portion thereof and cooperating with said enclosing side and end walls to define a bottom closure for said box, a first raising and lowering means connected to suspend a back end portion of said box, a second raising and lowering means pivotally connected to a front feed end portion of said chute to suspend the front end portion of said box and maintain said chute in its upper bottom-closing-off position with respect to said box when said box is suspended by said first and second means, said first and second means having carrier means constructed to move said box in a suspended relation from a material-receiving position to a material-discharging position in substantial alignment with and above the feed open portion of the roof wall, means for swinging the door to its downwardly-declining position with respect to the furnace chamber when said box is in a material-discharging position, a support above the roof wall for receiving the front end portion of said box when said box is positioned above the open feed portion in its material-discharging position, so that said second means may be employed to lower a front feed end portion of said chute about said swingable securing means, said chute in its lower position extending through the open feed portion and in an inwardly-declining slidable relation above and beyond the door in its downwardly-declining position within the furnace chamber, means cooperating with the front end portion of said box to move said box longitudinally forwardly and backwardly on said support to vary the position of said swingable securing means for the back feed end portion of said chute and vary the angle of inclination of said chute within the furnace chamber with respect to said door for feeding the material at a desired rate to and distribute it substantially uniformly within the furnace chamber until said box is emptied, said first means being operatable to raise and lower said box on said support and with respect to said chute to control the feed of the material from said chute, said second means being operatable to raise said chute to its upper closing-off position with respect to said box and in cooperation with said first means and by said carrier means to return said box in a suspended relationship to a position for again charging it with the material, and said means for swinging the door being constructed to raise the door to its upper closing-off position with respect to the open feed portion.

16. An apparatus as defined in claim 1 wherein said box has an inclined guide member therewithin sloping forwardly from its back end portion to a position in substantial alignment with the back end portion of said chute for delivering the material to said chute when it is in its inclined material-feeding position with respect to the furnace.

References Cited in the file of this patent

UNITED STATES PATENTS

| | | |
|---|---|---|
| 758,498 | Backlund | Apr. 26, 1904 |
| 1,790,034 | Wakefield | Jan. 27, 1931 |
| 2,402,152 | Dryewiecki | June 18, 1946 |
| 2,591,424 | Gumpp | Apr. 1, 1952 |
| 2,662,764 | Arutunoff | Dec. 15, 1953 |
| 2,679,325 | Smith | May 25, 1954 |
| 2,833,586 | McFeaters | May 6, 1958 |

UNITED STATES PATENT OFFICE
CERTIFICATE OF CORRECTION

Patent No. 3,003,650                      October 10, 1961

Levi S. Longenecker

It is hereby certified that error appears in the above numbered patent requiring correction and that the said Letters Patent should read as corrected below.

Column 1, line 11, for "strap" read -- scrap --; column 8, line 61, strike out "not".

Signed and sealed this 3rd day of April 1962.

(SEAL)
Attest:

ERNEST W. SWIDER
Attesting Officer

DAVID L. LADD
Commissioner of Patents